Nov. 19, 1963 J. L. ANDERSON 3,111,650

SUPERCONDUCTIVE RING CIRCUIT

Filed Dec. 18, 1959 3 Sheets-Sheet 1

INVENTOR
JOHN L. ANDERSON

Thomas & Crickenberger
ATTORNEYS

Nov. 19, 1963 J. L. ANDERSON 3,111,650

SUPERCONDUCTIVE RING CIRCUIT

Filed Dec. 18, 1959 3 Sheets-Sheet 3

1

3,111,650
SUPERCONDUCTIVE RING CIRCUIT
John L. Anderson, Poughkeepsie, N.Y., assignor to International Business Machines Corporation, New York, N.Y., a corporation of New York
Filed Dec. 18, 1959, Ser. No. 860,551
17 Claims. (Cl. 340—173.1)

Figure 1:
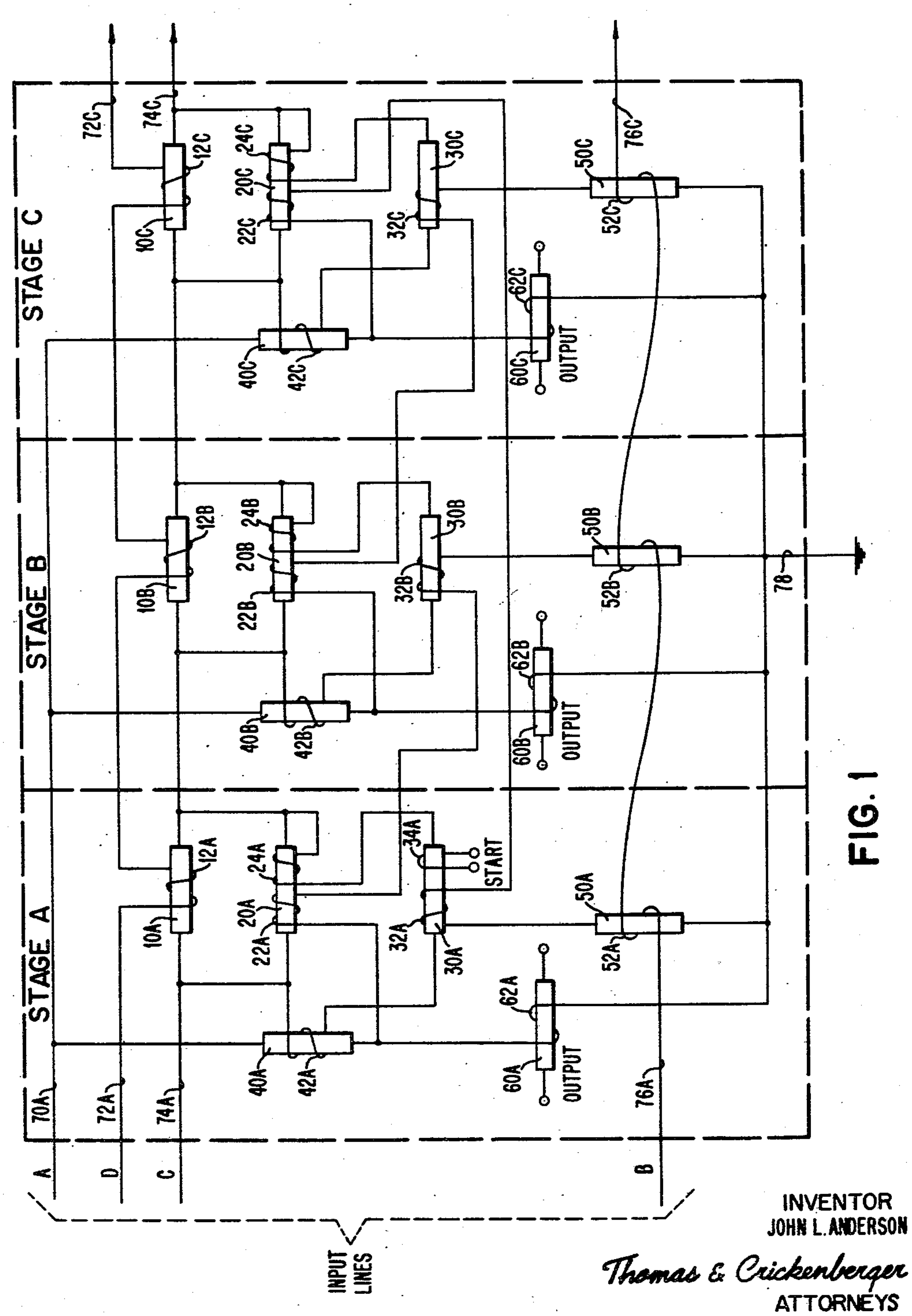

The present invention relates to superconductive devices and more particularly to such devices which operate as ring circuits or commutator circuits.

Ring and commutator circuits may be described generally as circuits which include a group of stages and respond to signals from a pulse source to produce an output signal from each stage in succession. In certain ring circuits employing superconductors a persistent current is set up in one stage in response to a group of input pulses. The information indicated by the presence of a persistent current may be shifted from stage to stage around the ring in response to subsequent groups of input pulses. The persistent current of one stage may be employed to condition the adjacent succeeding stage so that it may store a persistent current when a subsequent group of input pulses are applied. In such case the persistent current of one stage must be present for control purposes in order for a persistent current to be established in the adjacent succeeding stage. It is essential in such circuits that a persistent current be present in one of the stages at all times.

According to the present invention a ring circuit is provided in which superconductive elements are used throughout and in which a persistent current is used to indicate the presence of information and/or control the transfer of information. In ring circuits according to this invention the persistent current need not be present at all times, but it may be allowed to decay before a persistent current is established in the next stage.

In a preferred arrangement of this invention a ring circuit is provided which includes a plurality of interconnected stages, each of which includes a plurality of cryotrons. A first group of cryotrons in each stage are connected in parallel to provide alternate current paths through which a current from a D.C. source may flow. Some of the remaining cryotrons are controlled to cause a diversion of the direct current from one of the alternate paths to another in response to particular input pulses; whereas, others of the remaining cryotrons form a plurality of loop circuits in which persistent currents temporarily may be established in response to given input pulses. If one stage of the ring circuit is set in the One state and the remaining stages are set to the Zero state, the One state may be shifted around the ring circuit in response to sets of input pulses. An output cryotron of each stage may be interrogated to determine the presence or absence of the binary One state in a particular stage.

One feature of the present invention is the provision of a circuit in which a persistent current is employed to control the path of a direct current, after which the persistent current may decay without changing the status of the circuit.

Another feature of the present invention is to provide a ring circuit which utilizes a direct current in combination with persistent currents and input pulses to transfer information around the ring circuit.

A further feature of the present invention is the provision of a ring circuit in which a persistent current conditions a succeeding stage by diverting a direct current from one alternate path to another in that stage.

A still further feature of the present invention is to provide a super-conductive ring circuit where all of the

2 cryotrons employed in its construction may have similar characteristics, thereby permitting standardization of parts and the resultant economies of manufacture from the use of mass production techniques.

Figure 1A:
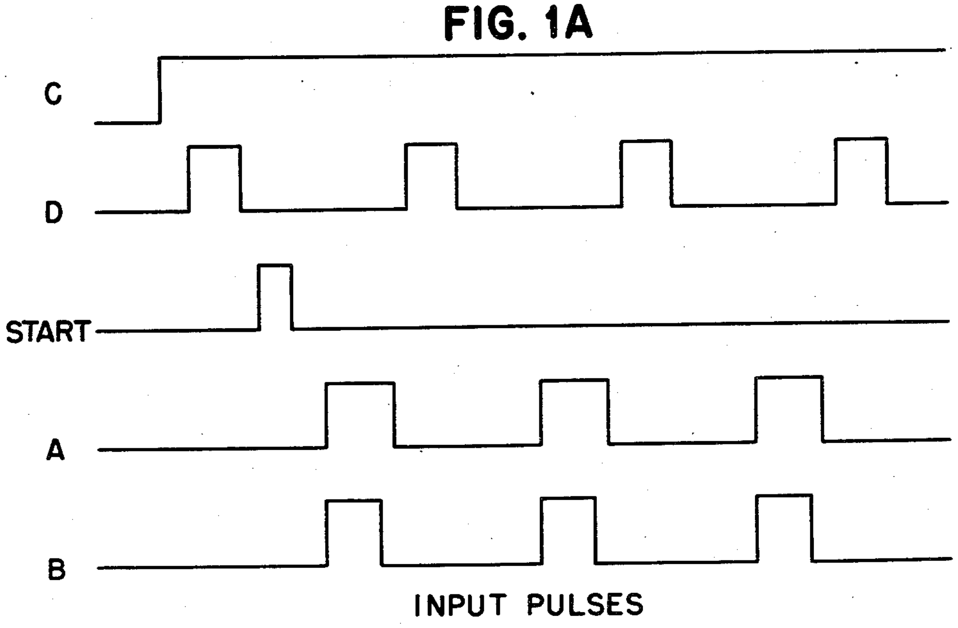
Figure 2A:
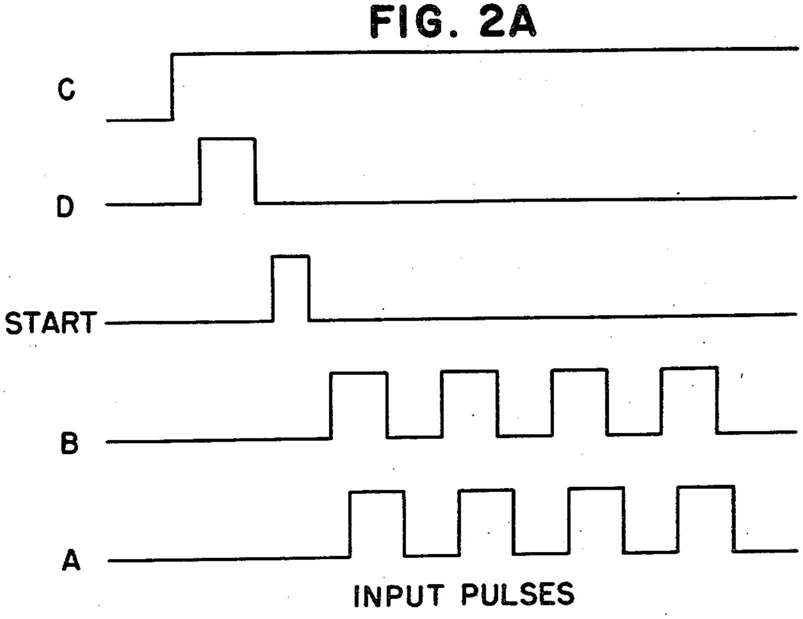
Figure 2:
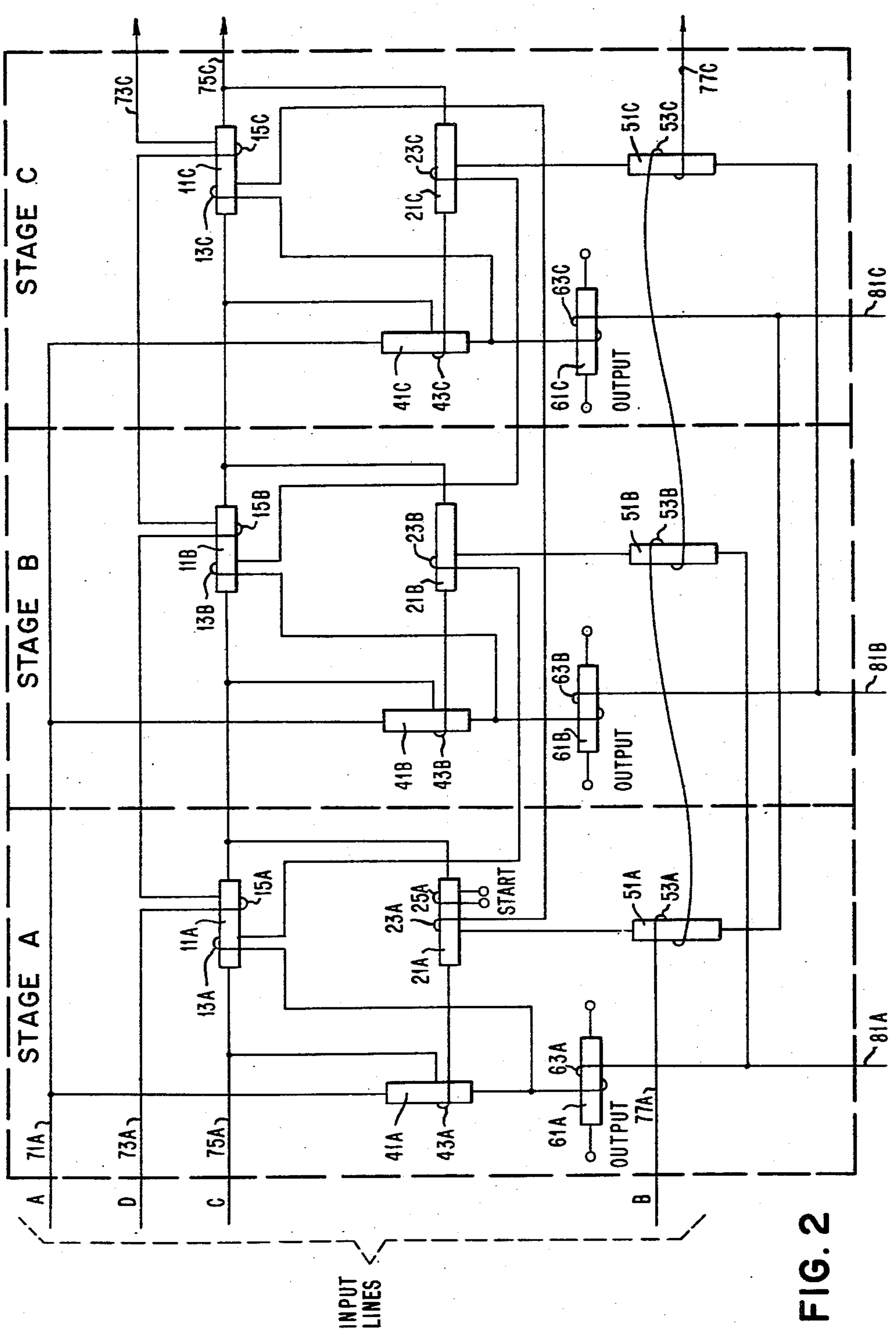

These and other features of this invention may be more fully appreciated when considered in the light of the following specification and drawings in which:

FIG. 1 is a schematic representation of a ring circuit constructed in accordance with the principles of the invention;

FIG. 1*a* is a diagram of the inputs for the circuit of FIG. 1;

FIG. 2 is a further embodiment of a ring circuit which is constructed in accordance with the principles of the invention and which differs from the embodiment of FIG. 1 in that each stage employs only five cryotrons; and FIG. 2*a* is a diagram of the inputs for the circuit of FIG. 2.

Each of the gates of the cryotrons in the ring circuits disclosed herein is constructed of a material which is a superconductive state at the operating temperature of the circuit in the absence of a magnetic field, but each gate is driven resistive by a magnetic field produced when a current greater than a predetermined minimum or threshold current is caused to flow in its control winding. The remaining portions of the circuit, that is, the cryotron control windings and the connections between the various components are fabricated of a superconductor material which remains in a superconductive state under all conditions of the circuit operation. For example, the gates may be constructed of tantalum, and the remaining portions of the circuit may be constructed of niobium, or other suitable materials may be employed, such as, those discussed in the article by D. A. Buck, "The Cryotron—A Superconductive Computer Component," Proceedings of the IRE, pp. 482–493, April 1956. The magnitude of the current flowing through each element (gates, windings and connections) of the circuit is chosen so as not to exceed the threshold current of that particular element. According to one feature of the present invention all of the cryotrons employed in the ring circuits herein preferably have similar characteristics.

While the cryotrons shown in the drawings are depicted as the wire-wound type, this is done because it is believed that this type of representation provides a more graphic illustration. However, in practice film-type cryotrons are perferably employed in circuits constructed and operated in accordance with the principles of the present invention. For a detailed discussion of film-type cryotron and the manner in which they may be constructed, reference may be made to copending applications, Serial No. 625,512 and Serial No. 765,760 filed respectively on November 30, 1956, and October 7, 1958, both of which have been assigned to the assignee of the present invention.

The circuit shown in FIG. 1 comprises three stages A, B and C connected together to form a ring circuit. Each of these stages includes a plurality of cryotrons, each of which is made up of a gate element and one or more control windings. If no current flows in the control winding of a cryotron, the gate element is superconductive and allows current to flow therethrough; however, whenever a current of sufficient magnitude flows through a control winding of a cryotron, the gate element assumes a resistive state, thereby preventing loss-free current flow therethrough.

A plurality of input sources, not shown, for supplying direct current C and pulses A, D and B are connected to the input lines 74A, 70A, 72A and 76A, respectively. An information pulse source, not shown, is connected to the start winding 34A in stage A. The return path for the input pulse on line 70A is through line 78 to ground, and the return path for the inputs on lines D, C and B are through lines 72C, 74C and 76C, respectively.

It should be noted that the reference numerals for corresponding elements of each stage are similar and differ only in the letter suffixed thereto to denote the stage in which they are employed. Three of the cryotrons of each stage are connected to define a parallel circuit. These parallel circuits are connected in series with a direct current source, not shown, connected to input line 74A. In stage A, for example, the parallel circuit is comprised of alternative paths through gate element 10A, gate element 20A, and the series circuit of control winding 42A, gate element 30A and control winding 24A. The state of the gate elements 10A, 20A and 30A determine the path or paths through which the direct current C will flow in this stage. If, for example, gate element 10A is made resistive by current flow through the winding 12A, the direct current in line 74A will tend to flow through gate 20A and through the series connection of winding 42A, gate 30A and winding 24A, and the current division between these two paths will be inversely proportional to the inductance in the paths, with the larger fraction going through gate 20A. The fraction of this direct current flowing in gate 30A will be sufficient to introduce enough resistance in gate 20A so that more current flows in gate 30A until finally, all of this current will flow in gate 30A. Since this current also flows through the winding 42A gate element 40A will be made normal or resistive.

The cryotrons of the ring circuit are arranged to provide a plurality of persistent current loops in which a stored current may circulate. For example, a first of these loops, which may be designated as the stage A loop, is defined by control winding 62A, gate element 50B, control winding 32B and control winding 22A. This loop, and the remaining loops of the ring circuit, interconnect two adjacent stages.

In order to store a persistent current in a superconductive loop, it is necessary to apply a current to the loop in such a way as to provide a net flux threading the loop and, thereafter, remove the applied current at a time when the loop is entirely superconductive. Since it is a characteristic of the phenomena of superconductivity that the net flux threading a completely superconductive loop cannot be changed, a persistent current is established in the loop to maintain the net flux threading the loop constant when the externally applied current signal is removed. In the instant invention, each loop is fabricated to include two paths which are connected in parallel across the A pulse supply source for the loop. A portion of one of these paths is maintained in a resistive state by the application of a B pulse while an A current pulse is applied to the loop to cause the pulse to be directed into the other of the parallel paths. By causing the applied current pulse to be directed to one of the paths in this way, a net flux threading the loop is provided. Thereafter, the loop is allowed to become superconductive by the removal of the B pulse; whereupon, the subsequent termination of the A pulse causes a persistent current to be established in the loop.

When a One is set up in stage A, a persistent current will be established in the first loop as will be explained in greater detail hereinafter. When a persistent current circulates in this loop, it will flow through windings 62A, 32B and 22A thereby making respective gate elements 60A, 30B and 20A normal. When gates 20A and 32B are made resistive the direct current C flowing in the parallel circuits in stages A and B will be diverted from one path to another as will be subsequently explained in greater detail. Since this persistent current makes gate element 60A resistive the presence of a circulating current can be determined by measuring the state of the output gate element 60A. The necessary circuitry to accomplish this is believed to be readily apparent to those skilled in the art as it is only necessary to determine the presence or absence of resistance in gate 60A. Likewise, the presence or absence of a persistent current in the second and third loops of the ring circuit may be determined by measuring the state of output gate elements 60B and 60C, respectively.

The operation of the ring circuit in FIG. 1 as a whole will now be described with reference to the pulse diagram of FIG. 1A. Initially, all of the cryotrons of the ring circuit in FIG. 1 are superconducting and present no resistance to current flow. A direct current C is applied to line 74A. This current flows in the alternative paths of the parallel circuits of each stage, each parallel circuit arrangement including a gate element 10, a gate element 20 and a series circuit including a winding 42, a gate element 30 and a winding 24. The current division between the alternative paths in each stage will be inversely proportional to the inductance in each path, with the larger fractions flowing through the gates 10 and the gates 20. When a D pulse is applied to line 72A, it drives the gates 10 resistive causing all of the direct current C to flow through the gates 20 and the gates 30. The fraction of current C flowing in the windings 42, gates 30 and windings 24 is sufficient to introduce enough resistance in gates 20 so that more current flows in the gate 30 paths until finally, all of the current C is flowing in the gate 30 paths. This current holds the gates 40 resistive. All stages are then reset to the Zero state.

After pulse D has been terminated a start current pulse representative of information is applied to the start winding 34A to initiate storage of a One in stage A. This pulse causes gate 30A to go resistive, and thereby divert the current C from this gate into gates 10A and 20A. With the current thus diverted, no current flows in the winding 42A, and hence gate 40A goes superconductive. It should be pointed out here that when the current C is diverted into a particular alternate path or paths, it will continue to flow there even though a gate in a remaining path, from which current was diverted by reason of that gate going resistive, goes superconductive. For example, upon the termination of the D pulse, the current C will continue to flow in the gate 30 paths until this current is diverted by reason of one of the gates 30 going resistive.

After the start pulse in FIG. 1A has terminated, pulses A and B in FIG. 1A are applied to respective lines 70A and 76A in FIG. 1. Pulse B causes gates 50A, 50B and 50C to go resistive. Pulse A flows through gate 40A, which is now superconductive, winding 62A and line 78 through the ground connection back to the A pulse source. Pulse A does not flow through gates 40B and 40C since both of these gates are resistive. Pulse A also does not flow through winding 22A, which is connected to gate 40A and in parallel with winding 62A, because this path is blocked by the resistive gate 50B. Removal of pulse B allows gates 50A, 50B and 50C to return to their superconductive state, and when pulse A later is terminated a persistent current circulates around the first closed loop consisting of the winding 62A, the gate 50B, the winding 32B and the winding 22A. According to one of the features of this invention the persistent current causes gates 20A and 30B to go resistive, thereby diverting direct current C from these gates. The persistent current will continue to flow in this loop holding the gates 20A and 30B resistive until it is subsequently destroyed. This persistent current may be said to represent a stored One in stage A, and this information may be read by determining the state of gate 60A which is resistive due to the circulating current flowing through winding 62A. Thus, a One has been stored in stage A, and stages A and B have been conditioned so that a subsequent set of D, A and B pulses can transfer this information to stage B.

Since the gates 20A and 30B are now resistive, application of a second D pulse to the line 72A causes the direct current C to be diverted from the gate 10A to the winding 42A, the gate 30A and the winding 24A, thereby making the gate 40A resistive. This direct current also flows in gate 20B since it has been diverted from gates 10B and 30B. Current C also flows through gates 20C and 30C, but the fraction of this current which flows in gate 30C due to the inverse inductive current division is designed to be sufficient subsequently to hold the gate 20C resistive. Hence, current C flows through the winding 42A, the gate 30A, the winding 24A, the gate 20B, the winding 42C, the gate 30C and the winding 24C back to the direct current source along the exit line 74C. The second B pulse makes the gates 50A, 50B and 50C go resistive, and the only superconductive path through which the second A pulse may flow is through the gate 40B and the winding 62B. Removal of the pulse B followed by the removal of the pulse A causes a persistent current to be set up in the second loop which includes the winding 62B, the gate 50C, the winding 32C and the winding 22B. Thus it is seen that the second set of D, A and B pulses causes an operation similar to that of the first set of pulses, but this time the persistent circulating current is established in the second loop. According to a feature of the invention, the second B pulse dissipates the persistent current in the first loop by driving the gate 50B resistive, the direct current C diverted into gates 30A and 20B remains so diverted even after the persistent current and pulse D terminate. Thus the removal of the persistent current from the first loop is permissible since its function of diverting current in stages A and B has been performed, and the next D, A and B pulses establish a persistent current in the second loop.

Once information is put into a stage of the ring, subsequent sets of D, A and B pulses serve to transfer this information from stage to stage around the ring, and the presence or absence of a persistent current in any loop, which is indicative of this information, may be indicated by determining the state of the output gate 60 of that loop. While three stages have been illustrated, it is to be understood that the number of stages employed may be increased or diminished as desired.

In the above description of FIGS. 1 and 1A, the presence of a persistent current in a loop has been taken to be indicative of stored information, and the diversion of current C into one or the other of the alternative paths has been considered a control operation. However, an alternative consideration of such a system may be made in which the diversion of direct current from one parallel path to another in each stage in indicative of the information and the setting up of a persistent current is a control function. The operation of the system remains the same as described above except that interrogation of the output gates 60A, 60B and 60C must occur during the A pulses. When the direct current C is diverted from a gate element 30 in a given stage, this may be taken to indicate a One in that particular stage. For example, when a start pulse is applied to winding 34A of stage A, the current C is diverted from the gate element 30A to either or both of the gates 10A and 20A. This allows the gate element 40A to go superconductive. When the following A pulse is applied, the One state of stage A may be read out by simultaneously interrogating the gate 60A. Upon the termination of the A pulse, a One is established in the stage B. The persistent current remaining in the first loop renders the gate 30B resistive, thereby diverting the direct current from that path in stage B. This information representative of a One may be read out by interrogating the output gate 60B during the application of the next A pulse. It is pointed out that the A pulses may occur randomly, but when they do occur they are accompanied by a B pulse in the same relationship as is illustrated in FIG. 1*b*. Furthermore, the B and D pulses may continue to arrive without the A pulses and without upsetting the shifting or counting operation of the ring circuit. The B pulses alone destroy a persistent current, but the control effect of the persistent current has taken place in diverting the D.C. current from a gate element 30 in a parallel path of a parallel circuit. Hence, the presence of the persistent current is not further required once the D.C. current diversion has taken place.

The ring circuit of FIG. 2 is similar in its basic aspects to the circuit of FIG. 1, differing primarily in that each stage of the circuit of FIG. 2 employs one less cryotron. The operation of the circuit of FIG. 2 is essentially the same as that of FIG. 1; however, only a single priming pulse D is necessary.

Each stage in FIG. 2 has a parallel circuit including two branches or paths defined by gate elements 11 serving as one path and windings 43 and gate elements 21 serving as a second path. The numerals of corresponding elements in the different stages are the same except for the letter suffix which denotes the stage in which the element is employed. The parallel circuits of each stage are connected in series across a direct current source, not shown, by lines 75A and 75C. Lines 71A, 73A and 77A provide the input paths for pulses A, D and B, respectively. Lines 81A, 81B and 81C provide the return paths for the A pulses, and lines 73C and 77C provide the return paths for the D and B pulses, respectively. The operation of gates 41, gates 61 and gates 51 are the same as the corresponding gates of FIG. 1.

The operation of the ring circuit of this embodiment will now be described with reference to the pulse diagram of FIG. 2A. Initially all gates are superconductive, and the direct current C flows through the gates 11, and the parallel branches including the windings 43 and gates 21. Upon the application of the priming pulse D, direct current C is diverted from the gates 11 to the alternative current paths including the windings 43 and gates 21. When pulse D is terminated, the direct current C remains diverted from the gates 11 through the gates 21 until it is forced to flow through the gates 11 by reason of gates 21 going normal or resistive.

A start pulse representative of information is next applied to winding 25A of stage A which makes gate 21A go resistive, thereby diverting direct current C from the gate 21A through the gate 11A. This diversion of current allows the gate 41A to go superconductive. After the start pulse is removed, pulses B and A are applied. Pulse B is applied to the line 77A which makes the gates 51A, 51B and 51C go resistive. Pulse A is applied to line 71A and flows through superconductive gate 41A, control winding 63A and line 81A back to the A pulse source. The alternative paths through which pulse A could flow include resistive gates 41B, 41C and 51B, and thus pulse A is diverted from these paths. Pulse B is removed before pulse A terminates, and upon removal of pulse B, the gates 51A, 51B and 51C go superconductive. Upon the subsequent termination of pulse A, a persistent current is set up in the first loop which includes the winding 63A, gate 51B, winding 23B and winding 13A. At this time information denoting a One is stored in stage A, and this information may be read out by determining the state of output gate 61A which now is resistive. According to another feature of the invention the persistent current flowing in the first loop makes the gate 11A resistive, thereby diverting direct current C from this gate into the alternative path which includes the winding 43A and the gate 21A. This persistent current also makes the gate 21B in stage B resistive thereby diverting direct current C from the gate 21B through the gate 11B.

The subsequent application of sets of B and A pulses will transfer the information initially set up in the first stage around the ring. For example, when the second B pulse is applied, the gates 51 go resistive and thereby destroy the circulating current in the first loop. However, according to one of the features of the present invention, stage B remains set because the diversion of current C from the gate 21B to gate 11B serves as a temporary memory of the previous state. The second A pulse finds gate 41B superconductive and the gates 41A, 41C and 51C resistive. Thus the A pulse passes through the gate 41B. Upon the removal of pulse B and then the removal of pulse A, a persistent current is set up in the second loop consisting of the winding 63B, the gate 51C, the winding 23C and the winding 13B. The persistent current flowing in the second loop makes the gate 61B resistive and the One stored in stage B may be read out by interrogating the gates 61A, 61B and 61C. Only the gate 61B is resistive.

Thus, the circuit of FIG. 2 operates in response to further B and A pulses to shift the One from stage B to stage C, etc. The ring circuit of FIG. 2 uses one less cryotron per stage than the ring circuit of FIG. 1. The ring circuit of FIG. 2 requires only one D pulse. Only three stages have been illustrated, but it is to be understood that more, or less, stages may be employed as desired.

In the alternative, a consideration of the circuit of FIG. 2 may be made in which the diversion of direct current from one parallel path to another in a given stage in indicative of the information in that stage, and the setting up of a persistent current is a control function. The operation of the system remains the same as described above except that interrogation of the output gates 61A, 61B and 61C must occur during the A pulses. When the direct current C is diverted from a gate element 21 in a particular stage, this may be taken to indicate a One in that stage. For example, when a start pulse is applied to winding 25A of stage A, the current C is diverted from the gate 21A to the gate 11A which allows the gate 41A to go superconductive. When the first A pulse is applied, the One state of stage A may be read out by simultaneously interrogating the gate 61A. Upon the termination of a first set of B and A pulses a One is established in stage B. The persistent current remaining in the first loop renders the gate 21B resistive, thereby diverting the direct current C from that path in stage B. The information representative of a One may be read out of stage B by interrogating the output gate 61B during the application of the second A pulse. Subsequent sets of B and A pulses shift this information around the ring circuit. It is pointed out that the B pulses may occur periodically and the A pulses may occur randomly. In each instance where a shift operation takes place an A pulse must be accompanied by a B pulse. In the case where the A pulses occur randomly, the first B pulse which occurs alone destroys the persistent current in the active stage, but the direct current C is diverted by this time from a gate 21 in the next succeeding stage. The destruction of the persistent current does not affect the operation of the ring circuit, and thus the B pulses may continue to occur without affecting the ring circuit. When a B pulse occurs, accompanied by an A pulse, a persistent current is established in the stage in which the direct current C has been diverted from a gate 21.

As should now be apparent to those skilled in the art a ring circuit employing cryotrons has been described in which information stored in one stage of the ring may be shifted from stage to stage around the ring and read from each stage. Alternatively, information may be read from selected stages.

What is claimed is:

1. A ring circuit comprising a plurality of interconnected stages; each of said stages including a parallel circuit; said parallel circuits being connected in series with a direct current source whereby direct current may flow through the parallel paths of each parallel circuit; first means to cause a diversion of said direct current from a first path of said parallel paths to a second path of said parallel paths of each stage; second means to apply a set of pulses to said ring circuit; a plurality of loop circuits interconnecting adjacent stages of said ring circuit; and third means to cause a diversion of said direct current from a second of said paths to a first of said paths in one of said stages which conditions said one stage to receive said set of pulses to cause a first circulating current to be set up in a first loop circuit interconnecting said one stage and the next succeeding stage, whereby said circulating current causes a diversion of said direct current from said first path to said second path of said one stage and causes a diversion of said direct current from the second path to the first path of said next succeeding stage to condition that stage to receive another of said set of pulses.

2. A ring circuit as in claim 1 wherein said another of said set of pulses destroys said first circulating current and subsequently causes a second circulating current to be set up in a second loop circuit interconnecting said next succeeding stage and the next succeeding stage.

3. A ring circuit as in claim 1 wherein continued application of sets of said set of pulses destroys the circulating current in a loop and sets up a circulating current in a next succeeding loop thereby advancing information around said ring circuit.

4. A ring circuit as in claim 3 including means to indicate the presence of stored information in a stage.

5. A ring circuit as in claim 1 wherein said set of pulses includes a first pulse which may occur periodically and a second pulse which may occur randomly; said first circulating current is destroyed by the second occurrence of said first pulse; and a second circulating current is set up in a second loop circuit interconnecting said next succeeding stage and the next succeeding stage upon the second occurrence of said second pulse and an occurrence of said first pulse.

6. A ring circuit as in claim 1 wherein said third means comprises a cryotron in series with said second path; and said cryotron includes a first winding to initially condition said one stage and a second winding to subsequently condition said one stage when a circulating current has been set up in the last loop of said ring circuit to thereby provide a continuous shifting of a circulating current and thereby transfer information around the ring circuit.

7. A ring circuit comprising: at least two interconnected stages each of which comprises a plurality of gating means; a pair of said gating means of each stage being interconnected to define two alternate current paths; said pairs of gating means being connected in series; means supplying direct current to said pairs of gating means; a loop circuit interconnecting at least one of the gating means of said one stage and at least one of the gating means of the next succeeding stage; and means to apply a pulse to one of said pair of gating means in one of said stages to cause said direct current to flow in the first of said two alternate paths in said one stage to thereby condition said one stage to allow storage of a persistent current in said loop circuit upon the subsequent application and termination of a plurality of pulses to certain of the gating means of said ring circuit, whereby said persistent current causes said direct current to flow in the second of said two alternate paths in said one stage and causes said direct current to flow in the first of said two alternate paths of the next succeeding stage.

8. A ring circuit as in claim 7 wherein said plurality of gating means comprises a plurality of cryotrons all of which have similar characteristics.

9. A ring circuit comprising: at least two stages each of which comprises a plurality of gate elements having a resistive state and a non-resistive state and each of which has winding means thereon; first means in each stage connecting a second of said elements with a first of said elements in each stage to form a parallel circuit having first and second alternate paths; said parallel circuits being connected in series and terminating in a first point, means to supply a continuous current to said first point whereby portions of said current flow in each of said alternate paths; each of a third of said plurality of elements of each stage having a pair of ends, all of the first of said pair of ends being connected to a second point and each of the second of said pair of ends being connected to one of a plurality of series circuits each of which comprises the winding means of the first element in its stage, the winding means of the second element in the next succeeding stage, and the gate element of a fourth of said elements of said next succeeding stage; said first means including the winding means of said third element of its respective stage; a fifth of said elements of each stage having its winding means connected in parallel with one of said plurality of series circuits thereby forming a plurality of loop circuits; additional winding means on each of said first elements connected in series and terminating in a third point, means to apply a current pulse to said third point to cause a change of state of each of said first elements whereby said continuous current is diverted through said second alternate path of each stage; additional winding means on said second element of the first of said stages; means for applying an information pulse thereto whereby said current is diverted through said first alternate path of the first of said stages and said third element assumes a second of said states; the winding means of each of said fourth elements being connected in series and terminating in a fourth point; means for applying sets of pulses to said second and fourth points whereby upon the termination of a first set of said pulses a first persistent current is set up in a first of said plurality of loop circuits causing said continuous current to be diverted to the second alternate path in the first of said stages and to be diverted to the first of said alternate paths in said next succeeding stage, and upon the occurrence and termination of a subsequent set of said sets of pulses said first persistent current is destroyed and a second persistent current is set up in a second of said plurality of loop circuits causing said continuous current to be diverted to the second alternate path in said next succeeding stage; and means including said fifth element to determine the presence of information in a stage.

10. A ring circuit comprising a plurality of stages; a parallel circuit in each stage; each of said parallel circuits having alternative current paths; first means connecting said parallel circuits in series; second means to cause a direct current to flow through said parallel circuits; a plurality of cryotrons in each stage having a gate element and a winding thereon; the gate element of a first of said cryotrons in each stage being in a first of said alternative current paths of each stage, respectively; the winding of a second of said cryotrons of each stage being in a second of said alternative current paths of each stage; the gate element of said second cryotron of one stage being connected to a loop circuit comprising the winding of said first cryotron of said one stage, the winding of a third of said plurality of cryotrons of the next succeeding stage, the gate element of a fourth of said plurality of cryotrons of said next succeeding stage, and the winding of a fifth of said plurality of cryotrons of said one stage; third means to divert said direct current to the second of said alternative current paths of each stage; fourth means to apply a current pulse to the gate elements of said second of said plurality of cryotrons of each stage; fifth means to apply a current pulse to the windings of each of a fourth of said plurality of cryotrons of each stage, and sixth means to apply a current pulse to the winding of a third cryotron of said one stage, whereby upon application and termination of said current pulses in a predetermined order a persistent current is stored in said loop circuit.

11. A ring circuit as in claim 10 wherein said third means comprises a current pulse source connected to the windings of each of the first of said plurality of cryotrons.

12. A ring circuit as in claim 10 wherein said third means comprises a current pulse source connected to the windings of each of a sixth of said plurality of cryotrons, each of said sixth cryotrons being connected in a third of said plurality of alternative current paths of each stage.

13. A ring circuit as in claim 10 in which all of said plurality of cryotrons have similar characteristics.

14. A ring circuit comprising a plurality of interconnected stages; each of said stages including a parallel circuit; said parallel circuits being connected in series with a direct current source whereby direct current may flow through the parallel paths of each parallel circuit; first means to cause a diversion of said direct current from a first path of said parallel paths to a second path of said parallel paths of each stage; second means to apply a group of periodic pulses to said ring circuit; third means to apply a group of random pulses to said ring circuit; a first loop circuit interconnecting said one stage and the next succeeding stage; and fourth means to cause a diversion of said direct current from a second of said paths to a first of said paths in one of said stages which conditions said one stage to receive a first pulse of said group of periodic pulses and a first pulse of said group of random pulses to cause a first circulating current to be set up in said first loop circuit; whereby said circulating current causes a diversion of said direct current from said first path to said second path of said one stage and causes a diversion of said direct current from the second path to the first path of said next succeeding stage to condition that stage to receive another of said pulses of said group of periodic pulses and a second pulse of said group of random pulses.

15. A ring circuit as in claim 14 wherein a diversion of said direct current from a second of said paths in any one of said stages is indicative of information stored in that one stage.

16. A ring circuit as in claim 14 wherein the second pulse of said group of periodic pulses destroys said first circulating current; and the second pulse of said group of random pulses and a pulse of said group of periodic pulses causes a second circulating current to be set up in a second loop circuit interconnecting said next succeeding stage and the next succeeding stage.

17. A ring circuit as in claim 14 wherein the second pulse of said group of periodic pulses destroys said first circulating current; and no circulating current is set up in any loop circuit of the ring circuit until the occurrence of the second pulse of said group of random pulses and a pulse of said group of periodic pulses.

References Cited in the file of this patent

UNITED STATES PATENTS 3,002,111 Dumin ---------------- Sept. 26, 1961

OTHER REFERENCES

"Cryotron—A Superconductive Computer Component" (Buck), April 1956, Proceedings of the IRE, pages 482–493.

"Persistent Current Ring Counter" (Anderson et al.), IBM Technical Disclosure Bulletin, vol. 2, No. 2, August 1959, pages 53–54.